United States Patent [19]

Racciato et al.

[11] 4,214,912

[45] Jul. 29, 1980

[54] DEACETYLATED BORATE-BIOSYNTHETIC GUM COMPOSITIONS

[75] Inventors: Joseph S. Racciato, San Diego; Ian W. Cottrell, Solana Beach, both of Calif.

[73] Assignee: Merck & Co., Inc., Rahway, N.J.

[21] Appl. No.: 45,493

[22] Filed: Jun. 4, 1979

Related U.S. Application Data

[63] Continuation-in-part of Ser. No. 891,575, Mar. 30, 1978, abandoned, which is a continuation-in-part of Ser. No. 871,279, Jan. 23, 1978, abandoned.

[51] Int. Cl.² ............................................. C08L 5/00
[52] U.S. Cl. ..................................... 106/208; 536/114
[58] Field of Search ..................... 106/208; 536/1, 114

[56] References Cited

U.S. PATENT DOCUMENTS

| | | | |
|---|---|---|---|
| 3,054,689 | 9/1962 | Jeanes et al. | 106/162 |
| 3,933,788 | 1/1976 | Kang et al. | 8/62 |
| 3,960,832 | 6/1976 | Kang et al. | 106/5 |

OTHER PUBLICATIONS

Jeanes, A. et al., *Polysaccharide B-1459: A New Hydrocolloid Polyelectrolyte Produced from Glucose by Bacterial Fermentation*, Journal of Applied Polymer Science, vol. V, Issue No. 17, pp. 519-526 (1961).

*Primary Examiner*—Theodore Morris
*Attorney, Agent, or Firm*—Gabriel Lopez; Julian S. Levitt

[57] ABSTRACT

This invention relates to a deacetylated borate-biosynthetic gum or a partially deacetylated borate-biosynthetic gum having improved dispersion characteristics. The invention also relates to a method of preparing such compositions.

19 Claims, No Drawings

DEACETYLATED BORATE-BIOSYNTHETIC GUM COMPOSITIONS

RELATED APPLICATION

The present application is a continuation-in-part of copending U.S. Ser. No. 891,575 filed Mar. 30, 1978 which is a continuation-in-part of then copending U.S. Ser. No. 871,279 filed Jan. 23, 1978, both now abandoned.

BACKGROUND OF THE INVENTION

It is known that deacetylated xanthan gum possesses unusual and superior physical properties for a diversity of industrial and commercial uses. The deacetylated xanthan gum can be used as a thickening or bodying agent for edible compositions, cosmetic formulations, pharmaceutical vehicles and drilling muds. If may also be utilized as an emulsifying, stabilizing and sizing agent.

When deacetylated xanthan gum has been isolated, subsequent attempts to disperse it in solution requires high-speed mixing for extended times of complete solubilization. The practical effect of this is that when put in water, the deacetylated xanthan gum is quickly wetted on the outside, forming a sticky mass with the inside still dry. The result is a difficultly soluble material. The same effect is observed with other synthetic gums.

DETAILED DESCRIPTION

This invention relates to a deacetylated borate-biosynthetic gum or a partially deacetylated borate-biosynthetic gum having improved dispersion characteristics. The invention also relates to a method of preparing such compositions.

We have discovered a method of treating deacetylated biosynthetic gum wherein the product forms discrete particles and upon dispersion does not form a sticky mass but maintains a discrete particle size and shape, and is capable of dissolving with a minimum of stirring. This new process involves treatment of deacetylated biosynthetic gum with a borate compound. The result is a deacetylated borate-biosynthetic gum which is a dispersible dry powder having a high degree of solubility as compared to the deacetylated gum which has not been subjected to a borate treatment.

By a biosynthetic gum is meant a watersoluble extracellular heteropolysaccharide produced by a microorganism. Specific examples of biosynthetic gums are xanthan gum, S-7 gum, S-10 gum and S-21 gum. Xanthan gum is described in an article by Jeanes et al., J. Appl. Polymer Sci., 1961, 5, 519-526, S-7 gum is described in U.S. Pat. No. 3,960,832, S-10 gum is described in U.S. Pat. No. 3,933,788 and S-21 gum is described in pending U.S. Ser. No. 889,163 filed Mar. 23, 1978 which is a CIP of U.S. Ser. No. 842,646 filed Oct. 17, 1977, now abandoned. The disclosure of this pending U.S. patent application is hereby incorporated by reference.

Native (unmodified) xanthan gum as formed in the fermentation is the acetyl-ester form of a polymer comprising mannose, glucose and glucuronic acid in the approximate ratio of 2:2:1. The acetyl group comprises about 4.7% of the native polymer and is present as the ester of a sugar hydroxyl group, that is, as the O-acetyl. Native (unmodified) S-7 gum is the acetyl-ester form of a polymer comprising glucose, rhamnose and guluronic acid in the approximate ratio of 6.6:1.5:1. The acetyl group comprises about 8-10% of the native polymer and is present as the ester of a sugar hydroxyl group, that is, as the O-acetyl. Native (unmodified) S-10 gum is the acetyl-ester form of a polymer containing about 3% protein and about 97% carbohydrate comprising glucose, galactose, glucuronic acid and fucose in the approximate ratio of 3:2:1.5:1. The acetyl group comprises about 4.5% of the native polymer and is present as the ester of a sugar hydroxyl group, that is, as the O-acetyl. Native (unmodified) S-21 gum is the acetyl ester form of a polymer comprising mannose, glucose, galactose and glucuronic acid in the approximate ratio of 2:1.7:1.2:1. The acetyl group comprises about 5.7% of the native polymer and is present as the ester of a sugar hydroxyl group, that is, as the O-acetyl. Treating the biosynthetic gum in the fermentation beer is advantageous in that it eliminates the step of isolation and the redispersion of hard to disperse deacetylated gums. The borate treatment should be carried out at room temperature or higher and at a pH greater than 7. The amount of borate compound added to the biosynthetic gum will determine the degree of dispersion of the final product.

When the native (unmodified) biosynthetic gum is not heated, or is only slightly heated (up to about 35° C.), it results in only a partially deacetylated gum. The instant invention is intended to include such partially deacetylated borate biosynthetic gums. When the native (unmodified) biosynthetic gum is heated, to a temperature above about 35° C., the gum is usually completely deacetylated. The temperature range within which the native gum can be heated in order to effectuate deacetylation is from above about 35° C. to about 90° C. Thus, the present invention can be described as one wherein the pH of the biosynthetic gum is sufficiently adjusted above 7 and enough borate compound utilized to produce a product having improved dispersibility.

The amount of borate compound needed to produce a dispersible biosynthetic gum can be from about 0.1% to about 20% based on the dry weight of the deacetylated gum. A more desirable range of borate compound is from about 1% to about 5% based on the dry weight of the deacetylated gum.

Thus, the invention relates to a deacetylated or partially deacetylated borate biosynthetic gum which is water dispersible and which contains from about 0.1% to about 20% by weight of a borate compound.

The deacetylated borate biosynthetic gum is dispersible in neutral to alkaline solutions. A more preferred pH range is from about 9.0 to about 10.5.

The borate compound can be any of those which are water soluble and can be used for treatment of a biosynthetic gum. Examples of such borate compounds are alkali metal tetraborates, alkali metal metaborates and the like. Specific examples of borate compounds are, for instance, lithium tetraborate, sodium tetraborate, potassium tetraborate, ammonium tetraborate, lithium metaborate, sodium metaborate and potassium metaborate.

The deacetylated borate-biosynthetic gum can then be precipitated, removed, dried and milled in a manner which is known to those skilled in the art. The product is a dry dispersible biosynthetic gum.

Production of xanthan gum beer, a starting material in the practice of one embodiment of the present invention, by *Xanthomonas campestris*, NRRL B-1459, under a variety of fermentations conditions is well known. Xanthan gum beer is also commercially available. The inventive feature of this application relates in one of its embodiments to the treatment of xanthan gum beer with borate, which is independent of the biosynthetic pathway of the Xanthomonas organism in its production of xanthan gum beer. It would be apparent therefore to one skilled in the art that the invention is operative using either B-1459 or a proprietary mutant strain of *Xanthomonas campestris* known by applicant's assignee to produce xanthan gum beer in somewhat higher yields than does B-1459. Since the function of the microorganism is merely to produce said beer of xanthan gum, availability of this mutant strain is not significant to the practice of this invention.

The following examples are capable of wide variation and modification, and any minor departure or extension is considered as being within the skill of the artisan and as falling within the scope of this invention.

EXAMPLE 1

Six (6) g. of sodium tetraborate 10 $H_2O$ (borax) are dissolved in 100 ml. of water and added to about 19 liters of native (unmodified) xanthan gum beer containing about 2.5% xanthan gum. After stirring, 100 ml. of 5N-NaOH solution is added to the beer and the beer heated with steam to 40° C. A further 50 ml. of 5N-NaOH solution is added with intermittant stirring over a 4-hour period in order to maintain the pH at 9.5–10.0 and achieve a final stable pH of 10. After this 4-hour period, from analysis of ester linkages it is determined that the gum is completely deacetylated.

The above deacetylated borate-xanthan gum beer and another 19 liter sample of native xanthan gum beer (pH 6.8) are each precipitated with 2.5 volumes of isopropyl alcohol, dried at 55° C. and milled through 40 mesh (Wylie Mill). Both the deacetylated borate and acetylated (native) dried gums are fibrous; however, the deacetylated borate gum is whiter than the acetylated (native) gum.

The hydration rate of 1% solutions of deacetylated borate gum samples at pH levels of 8.0, 9.0 and 10.0 are compared with 1% solutions of acetylated gum samples. The hydration rate is the rate of viscosity development. Three 297-ml aliquots of deionized water are adjusted to the pH's 8.0, 9.0 and 10.0, respectively with 0.1 N NaOH. Three (3) g. samples of deacetylated borate (treated) gum then added with slow stirring to each of the aliquots of water. The treated gum samples achieve a viscosity maximum between 1–5 minutes and a stable viscosity at 2 hours. The acetylated gum has to be dispersed in deionized water using a Waring blender. Table I lists the 1% viscosity properties of the deacetylated borate and acetylated gums in centipoises.

TABLE I

|  | Deacetylated borate gum | | | Acetylated gum |
|---|---|---|---|---|
|  | pH 8.0 | pH 9.0 | pH 10.0 | pH 8.2 |
| 5 minutes | 1730 | 2250 | 2150 | 930 |
| 2 hours | 1110 | 1200 | 1110 | 985 |
| pH of Final solution | 10.35 | 10.4 | 10.45 | 8.2 |

EXAMPLE 2

Six (6) g. of sodium tetraborate.10 $H_2O$ (borax) is dissolved in 100 ml. of water and added to about 19 liters of native xanthan gum beer containing about 2.5% xanthan gum. After stirring a 40% solution comprising 105 g. of 40% w/w of KOH in water, is added with continual stirring. The temperature of the beer is raised to 90° C. using steam for about 30 minutes and then allowed to cool to 33° C. The pH of the beer is 8.6 and the gum is completely deacetylated. Another 28 g. of 40% KOH is added to adjust the pH to 10.

The above deacetylated borate-xanthan gum (treated) beer and another 19 liter sample of native (untreated) beer (pH 7.1) after being heated to the same temperature of 90° C. are each precipitated with 2.5 volumes of isopropyl alcohol and dried at 55° C. The samples are milled through 40 mesh (Wylie Mill). The hydration rate of the deacetylated boratexanthan sample is determined wherein 2% fumaric acid and 1% sodium carbonate is dry blended. The hydration rate of 1% solution of the blends are carried out as described in the above sample. The results indicate that a stable viscosity and stable pH are reached after 30 minutes and the viscosities as determined are greater than 1000 cps.

EXAMPLE 3

Fifteen hundred (1500) ml. of native xanthan gum beer having a xanthan gum content of approximately 2.5% are treated with 0.375 g. of sodium tetraborate. There is also added 0.4% of tetrasodium pyrophosphate and sufficient sodium hydroxide solution to obtain a pH of 10.5. The beer is mixed and precipitated with about 2.5 volumes of isopropyl alcohol. The partially deacetylated borate (treated) gum is removed and then dried at 50°–55° C. The product is milled to yield a borate treated gum as a dry powder which is easily dispersible in water.

EXAMPLE 4

Aliquots of two fermentations beers containing about 2% (w/v) of S-7 gum, S-10 gum, and S-21 gum, respectively, are treated with 40% KOH (100 ml) and borax (6%, 100 ml). The temperature of the beer is raised to 80° with stirring. After analysis of ester linkages shows that deacetylation is completed, the aliquots are cooled to 40° C. An additional quantity of 40% KOA (10 ml) is added to the S-10 beer aliquot to raise its pH to 10. The gums are then isolated by precipitating with isopropyl alcohol at pH 10, drying in a steam oven at about 65° C. and milling through a 40 mesh screen.

The viscosities of 1% solutions of the dried milled gums are measured in deionized water at pH 10.4 and pH 7.0 and in 1% KCl and 1% brine solutions with the following results:

|  | Deionized Water pH 10.4 | Deionized[1] Water pH 7.0 | 1% KCL | 1% Brine[2] |
|---|---|---|---|---|
| Borate-treated S-7 | 1040 (S3) | 950 (S3) | 1750 (S3) | 820 (S3) |
| Borate-treated S-10 | 690 (S3) | 630 (S3) | 540 (S3) | 560 (S3) |
| Borate-treated S-21 | 2300 (S3) | 2340 (S3) | 2250 (S3) | 2550 (S3) |

All viscosities are determined using a Brookfield LVF Viscometer at 60 rpm, spindle No. in parentheses.
[1]Viscosity of solution after adjustment to pH 7 using hydrochloric acid.
[2]Brine is a solution containing 25.4g NaCl and 3.7 g of $CaCl_2 . 2HO$ per liter.

EXAMPLE 5

The hydration rates of dried and milled samples prepared as described in Example 4 are determined by measuring the rate of viscosity increase of slowly stirred solutions (1%) of the gums in tap water at 25° C. The results obtained are shown in the following table:

| Time | Viscosity (Brookfield LVF, 60 rpm) | | |
| --- | --- | --- | --- |
| (min.) | S-7 | S-10 | S-21 |
| 0 | 0 (S3) | 0 (S3) | 0 (S4) |
| 1 | 50 | 160 | 50 |
| 2 | 290 | — | 250 |
| 3 | 410 | 330 | 750 |
| 4 | 480 | 450 | 1450 |
| 5 | 570 | — | 2050 |
| 6 | 600 | 550 | 2300 |
| 8 | 650 | — | 2700 |
| 10 | 740 | 670 | 2700 |
| 12 | 750 | — | 2750 |
| 30 | 980 | 660 | 2500 |
| 60 | 910 | 670 | 2400 |
| 120 | 850 | 650 | 2250 |

What is claimed is:

1. A deacetylated borate-biosynthetic gum having enhanced dispersibility in water and which contains from about 0.5% to about 20% by weight of a borate compound.

2. An aqueous medium containing a gum according to claim 1.

3. A dry composition containing the gum of claim 1.

4. A gum according to claim 1 wherein the borate compound is present in an amount of from about 1.0% to about 5.0% by weight of the gum.

5. A deacetylated borate-xanthan gum of claim 1 wherein the borate compound is present in an amount from about 1.0% to about 5.0% by weight of the gum.

6. A deacetylated borate-S-7 gum of claim 1 wherein the borate compound is present in an amount from about 1.0% to about 5.0% by weight of the gum.

7. A deacetylated borate-S-10 gum of claim 1 wherein the borate compound is present in an amount from about 1.0% to about 5.0% by weight of the gum.

8. A deacetylated borate-S-21 gum of claim 1 wherein the borate compound is present in an amount from about 1.0% to about 5.0% by weight of the gum.

9. An aqueous medium containing the gum of claim 4.

10. A dry composition containing the gum of claim 4.

11. A partially deacetylated borate-biosynthetic gum having enhanced dispersibility in water and which contains from about 0.1% to about 20% by weight of a borate compound.

12. A gum according to claim 11 wherein the content of borate compound is from about 1.0% to about 5.0% by weight.

13. A borate-xanthan gum of claim 12.

14. A gum according to claim 1 which is prepared by reacting a biosynthetic gum with a borate compound at a pH greater than 7.

15. A gum according to claim 14 wherein the pH is from above about 7 to about 10.5.

16. A gum according to claim 15 wherein the pH is from about 9.0 to about 10.5.

17. A borate-xanthan gum of claim 16.

18. A process for preparing a borate biosynthetic gum comprising adjusting the pH of the fermentation beer containing a biosynthetic gum to between about 9.0 and about 10.5 in the presence of a borate compound.

19. A process for preparing a borate biosynthetic gum comprising adding a borate compound to a fermentation beer containing a biosynthetic gum, the beer having a pH of from about 9.0 to about 10.5.

* * * * *